United States Patent
Tanno et al.

(10) Patent No.: US 10,409,975 B2
(45) Date of Patent: Sep. 10, 2019

(54) SHORT-RANGE COMMUNICATION DEVICE, FUNCTION CONTROL METHOD AND FUNCTION CONTROL SYSTEM

(71) Applicant: NTT DOCOMO, INC., Chiyoda-ku (JP)

(72) Inventors: Tetsuhiro Tanno, Chiyoda-ku (JP); Akira Shibutani, Chiyoda-ku (JP); Kunio Yoshikawa, Chiyoda-ku (JP); Yuusaku Inoue, Chiyoda-ku (JP); Tetsuhiro Sasagawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 217 days.

(21) Appl. No.: 15/112,965

(22) PCT Filed: Dec. 12, 2014

(86) PCT No.: PCT/JP2014/083040
§ 371 (c)(1),
(2) Date: Jul. 20, 2016

(87) PCT Pub. No.: WO2015/122091
PCT Pub. Date: Aug. 20, 2015

(65) Prior Publication Data
US 2016/0350523 A1    Dec. 1, 2016

(30) Foreign Application Priority Data
Feb. 14, 2014   (JP) .................. 2014-026866

(51) Int. Cl.
*G06F 21/35*   (2013.01)
*G06F 21/62*   (2013.01)
(Continued)

(52) U.S. Cl.
CPC .............. *G06F 21/35* (2013.01); *G06F 21/32* (2013.01); *G06F 21/44* (2013.01); *G06F 21/629* (2013.01); *H04W 12/0802* (2019.01); *H04W 4/80* (2018.02)

(58) Field of Classification Search
CPC ....................................................... G06F 21/35
See application file for complete search history.

(56) References Cited

U.S. PATENT DOCUMENTS

2003/0199267 A1   10/2003   Iwasa et al.
2008/0289030 A1   11/2008   Poplett
(Continued)

FOREIGN PATENT DOCUMENTS

EP    1 801 721 A1   6/2007
JP    2004-161433 A   6/2004
(Continued)

OTHER PUBLICATIONS

Extended European Search Report dated Nov. 17, 2016 in Patent Application No. 14882395.8.
(Continued)

*Primary Examiner* — Simon P Kanaan
(74) *Attorney, Agent, or Firm* — Oblon, McClelland, Maier & Neustadt, L.L.P.

(57) ABSTRACT

A wearable module is a device capable of performing short-range communication with a mobile device. A functional section executes a function which can be locked and unlocked. A list retaining section retains a password for permitting locking/unlocking of the function for each mobile device. A short-range wireless communication section receives a request for locking or unlocking a function including a password from the mobile device. A lock control section controls the function to be locked or unlocked on the basis of the password included in the request and a password (Continued)

retained in association with the mobile device of a request source of the request by the list retaining section.

6 Claims, 10 Drawing Sheets

(51) Int. Cl.
G06F 21/32 (2013.01)
G06F 21/44 (2013.01)
H04W 12/08 (2009.01)
H04W 4/80 (2018.01)

(56) References Cited

U.S. PATENT DOCUMENTS

2009/0146947 A1 6/2009 Ng
2015/0314447 A1* 11/2015 Zhang ............... B25J 9/1689
  700/245
2016/0350523 A1* 12/2016 Tanno ............... G06F 21/44

FOREIGN PATENT DOCUMENTS

| JP | 2004-252931 A | 9/2004 |
| JP | 2004-320139 A | 11/2004 |
| JP | 2007-251565 A | 9/2007 |
| JP | 2010-209642 A | 9/2010 |
| JP | 2013-187879 A | 9/2013 |
| WO | 02/42890 A1 | 5/2002 |

OTHER PUBLICATIONS

English translation of the International Preliminary Report on Patentability and Written Opinion dated Aug. 25, 2016 in PCT/JP2014/083040.
International Search Report dated Mar. 24, 2015 for PCT/JP2014/083040 filed on Dec. 12, 2014.
Office Action dated Feb. 22, 2018 in European Patent Application No. 14 882 395.8.

* cited by examiner

| TYPE OF CHIP | LOCK STATE | PW |
|---|---|---|
| RF | LOCKED | 0000 |
| SE | LOCKED | 1111 |

(B)

| TERMINAL IDENTIFICATION INFORMATION | TYPE OF CHIP | CONNECTION STATE | PW |
|---|---|---|---|
| TERMINAL A | RF | CONNECTED | 0000 |
| TERMINAL B | RF | DISCONNECTED | 1111 |
| ⋮ | ⋮ | ⋮ | ⋮ |

(C)

| TYPE OF CHIP | LOCK STATE | PW |
|---|---|---|
| RF | LOCKED | AAAA |
| SE | LOCKED | AAAA |

SHORT-RANGE COMMUNICATION DEVICE, FUNCTION CONTROL METHOD AND FUNCTION CONTROL SYSTEM

TECHNICAL FIELD

The present invention relates to a short-range communication device, a function control method, and a function control system.

BACKGROUND ART

Conventionally, there is technology for performing lock control using a portable terminal and an authentication information recording medium capable of performing short-range communication. For example, as disclosed in Patent Literature 1, a portable terminal performs short-range communication with an authentication information recording medium possessed by a user to acquire ID information recorded by the authentication information recording medium when a call is received in a locked state in which the execution of a communication process is inhibited and the locked state is released when the ID information is valid.

CITATION LIST

Patent Literature

[Patent Literature 1] Japanese Unexamined Patent Publication No. 2013-187879

SUMMARY OF INVENTION

Technical Problem

The technology disclosed in Patent Literature 1 controls unlocking of the portable terminal using the authentication information recording medium, but does not perform lock control of a wearable module mounted on the user. As a method of performing lock control (function control) on the wearable module, a method using biometric authentication, etc. is considered because there is no input means in the wearable module.

However, although a method of performing function control of the wearable module using short-range communication from a terminal apparatus is excellent in terms of accuracy or the like due to the fact that there is no biometric recognition error, when control by an input of information for uniformly performing function control such as a password is performed, management of the information may take time and effort or mismatch may occur. Specifically, for example, the function control of the terminal apparatus and the function control of the wearable module may be performed in conjunction with each other. In this case, for example, a password for performing the function control in the terminal apparatus and a password for performing the function control of the wearable module should be set for each terminal apparatus. This requires time and effort because each of the password for performing the function control in the terminal apparatus and the password for performing the function control of the wearable module should be set and mismatch occurs when the passwords are different.

The present invention has been made to solve the above-mentioned problems, and an objective of the invention is to provide a short-range communication device, a function control method, and a function control system capable of performing function control with a high degree of convenience for a user.

Solution to Problem

A short-range communication device according to an embodiment of the present invention is a short-range communication device capable of performing short-range communication with a terminal apparatus, the short-range communication device including: a functional means configured to execute a function, wherein stop and stop release of the function are possible; a permission information retaining means configured to retain permission information which is information for permitting the stop or the stop release of the function by the functional means for each terminal apparatus; a reception means configured to receive a request for the stop or the stop release of the function by the functional means including permission information from the terminal apparatus; and a control means configured to control the stop or the stop release of the function by the functional means on the basis of the permission information included in the request received by the reception means and permission information retained in association with the terminal apparatus of a request source of the request by the permission information retaining means, wherein the short-range communication device includes a plurality of functional means configured to execute mutually different functions, and wherein the permission information retaining means retains the permission information in units of functional means.

Also, a function control method by a terminal apparatus according to an embodiment of the present invention is a function control method by a short-range communication device capable of performing short-range communication with a terminal apparatus and including a functional means configured to execute a function, wherein stop and stop release of the function are possible and a permission information retaining means configured to retain permission information which is information for permitting the stop or the stop release of the function by the functional means for each terminal apparatus, wherein the short-range communication device includes a plurality of functional means configured to execute mutually different functions and wherein the permission information retaining means retains the permission information in units of functional means, the function control method including: a reception step of receiving a request for the stop or the stop release of the function by the functional means including permission information from the terminal apparatus; and a control step of controlling the stop or the stop release of the function by the functional means on the basis of the permission information included in the request received in the reception step and permission information retained in association with the terminal apparatus of a request source of the request by the permission information retaining means.

According to the short-range communication device and the function control method according to the embodiment of the present invention as mentioned above, because the permission information which is the information for permitting the stop or the stop release of the function is retained for each terminal apparatus, the stop or the stop release of the function can be performed for the short-range communication device according to the terminal apparatus capable of transmitting the permission information and function control with a high degree of convenience for the user. Also, when a plurality of functions are provided in the short-range communication device, it is possible to perform the stop or the stop release in each function unit because the permission information is retained for each function.

Also, in the short-range communication device according to an embodiment of the present invention, the control means may transmit the permission information retained in association with the terminal apparatus by the permission information retaining means to a terminal apparatus other than the terminal apparatus related to the request received by the reception means together with control of the stop or the stop release of the function by the functional means. In this case, because the short-range communication device requests the stop or the stop release of the function for any terminal apparatus other than the terminal apparatus related to the request received by the reception means among terminal apparatuses in which the permission information of the function for which the stop or the stop release of the function is requested is defined, the terminal apparatus can collectively issue the request for the stop or the stop release of the function to any other terminal apparatus capable of controlling the short-range communication device by merely performing the stop or the stop release of the function for the short-range communication device once.

Also, the short-range communication device according to the embodiment of the present invention may further include a second control means configured to input biometric information and control the stop or the stop release of the function by the functional means on the basis of the input biometric information. In this case, because the stop or the stop release of the function is performed on the basis of the biometric information in the short-range communication device, the short-range communication device can independently perform the stop or the stop release of the function without the request for the stop or the stop release from the terminal apparatus.

A function control system according to an embodiment of the present invention is a function control system including a short-range communication device capable of performing short-range communication with a terminal apparatus and the terminal apparatus, wherein the short-range communication device includes: a functional means configured to execute a function, wherein stop and stop release of the function are possible; a permission information retaining means configured to retain permission information which is information for permitting the stop or the stop release of the function by the functional means for each terminal apparatus; a reception means configured to receive a request for the stop or the stop release of the function by the functional means including permission information from the terminal apparatus; and a control means configured to control the stop or the stop release of the function by the functional means on the basis of the permission information included in the request received by the reception means and permission information retained in association with the terminal apparatus of a request source of the request by the permission information retaining means, wherein the short-range communication device includes a plurality of functional means configured to execute mutually different functions, wherein the permission information retaining means retains the permission information in units of functional means, and wherein the terminal apparatus includes: a terminal-side functional means configured to execute a function, wherein stop and stop release of the function are possible; a terminal-side permission information retaining means configured to retain permission information which is information for permitting the stop or the stop release of the function by the terminal-side functional means; a terminal-side reception means configured to receive permission information; and a terminal-side control means configured to control the stop or the stop release of the function by the terminal-side functional means on the basis of the permission information received by the terminal-side reception means and the permission information retained by the terminal-side permission information retaining means and transmit a request for the stop or the stop release of the function by the functional means including permission information to the short-range communication device.

Also, a function control method in a function control system according to an embodiment of the present invention is a function control method to be executed by a function control system including a short-range communication device capable of performing short-range communication with a terminal apparatus and the terminal apparatus, wherein the short-range communication device includes: a functional means configured to execute a function, wherein stop and stop release of the function are possible; and a permission information retaining means configured to retain permission information which is information for permitting the stop or the stop release of the function by the functional means for each terminal apparatus, wherein the short-range communication device includes a plurality of functional means configured to execute mutually different functions, wherein the permission information retaining means retains the permission information in units of functional means, wherein the terminal apparatus includes: a terminal-side functional means configured to execute a function, wherein stop and stop release of the function are possible; and a terminal-side permission information retaining means configured to retain permission information which is information for permitting the stop or the stop release of the function by the terminal-side functional means, and wherein the function control method includes: a reception step of receiving, by the short-range communication device, a request for the stop or the stop release of the function by the functional means including permission information from the terminal apparatus; a control step of controlling, by the short-range communication device, the stop or the stop release of the function by the functional means on the basis of the permission information included in the request received in the reception step and permission information retained in association with the terminal apparatus of a request source of the request by the permission information retaining means; a terminal-side reception step of receiving, by the terminal apparatus, permission information in the terminal apparatus; and a terminal-side control step of controlling, by the terminal apparatus, the stop or the stop release of the function by the terminal-side functional means on the basis of the permission information received in the terminal-side reception step and the permission information retained by the terminal-side permission information retaining means and transmitting a request for the stop or the stop release of the function by the functional means including permission information to the short-range communication device.

According to the function control system and the function control method in the system according to the embodiments of the present invention, because the permission information which is the information for permitting the stop or the stop release of the function is retained for each terminal apparatus in the short-range communication device, it is possible to perform the stop or the stop release of the function for the short-range communication device according to the terminal apparatus capable of transmitting the permission information. Also, the terminal apparatus can perform the stop or the stop release of the function retained by the terminal apparatus using the same permission information.

Advantageous Effects of Invention

According to an embodiment of the present invention, it is possible to provide a short-range communication device, a function control method, and a function control system capable of performing function control with a high degree of convenience for a user.

BRIEF DESCRIPTION OF DRAWINGS

FIG. 2 is data examples of lists retained by a list retaining section (15) and a list retaining section (35).

DESCRIPTION OF EMBODIMENTS

Hereinafter, embodiments of the present invention will be described in detail with reference to the accompanying drawings. Also, the same or like elements will be denoted by the same reference symbols throughout the description of the drawings, without redundant description.

First Embodiment

Figure 1:
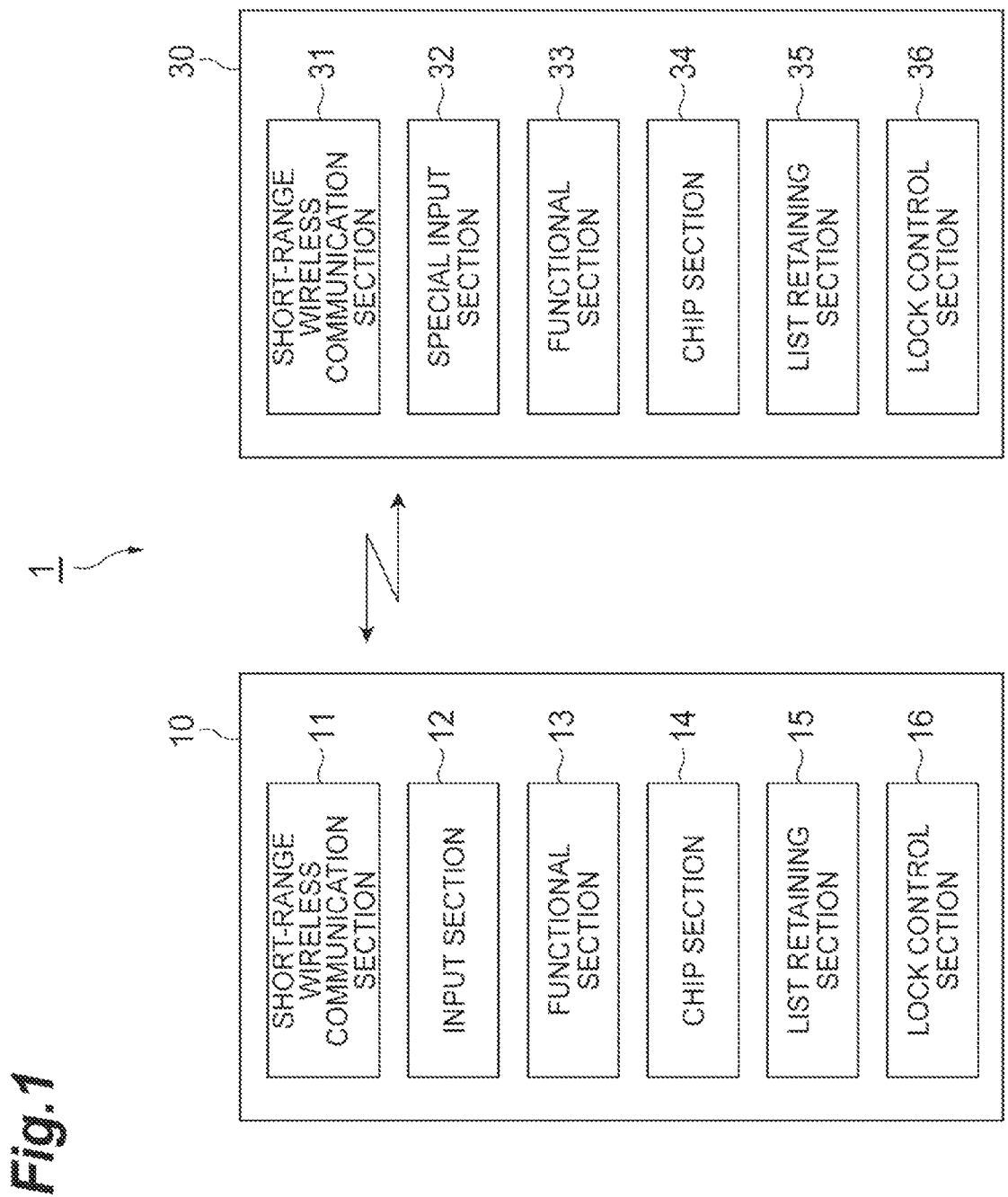
FIG. 1 is a block diagram of a function control system according to a first embodiment of the present invention.

A block diagram of a function control system 1 according to the first embodiment of the present invention is illustrated in FIG. 1. The function control system 1 is configured to include a mobile device 10 (terminal apparatus) and a wearable module 30 (short-range communication device). The mobile device 10 and the wearable module 30 can communicate with each other through short-range communication. Specifically, the mobile device 10 is a portable phone including a smartphone or the like. The wearable module 30 is a device capable of being worn by the user. Specifically, it is only necessary for the wearable module 30 to have a short-range communication function as a function of inputting/outputting information from/to the outside and it may be unnecessary to have a screen display function, a sound output function, an operation input reception function, etc. However, these functions may be provided. As a specific form of the wearable module 30, any form capable of being worn by the user such as a ring type or a wristwatch type can be provided. In general, the user of the mobile device 10 and the user of the wearable module 30 are the same as each other. In the wearable module 30, a chip (for example, a radio frequency (RF) chip, a secure element (SE) chip, or the like) is provided and a function is executed using the above-mentioned chip according to a request from the mobile device 10. Here, as an example of the function, there is a function of transmitting information retained by the SE chip to the mobile device 10 or the like. Here, the SE chip is a chip designed to withstand a malicious analysis attack from the outside and in which a memory securely storing data or a cipher logic circuit (function) is embedded. The RF chip is a chip for implementing contactless communication (short-range wireless communication).

In the function control system 1, the mobile device 10 transmits a password (permission information) for locking (function stop) and unlocking (function stop release) a predetermined function and the wearable module 30 registers the password in association with the mobile device 10 of a request source. When the mobile device 10 transmits the above-mentioned password and requests the locking of the predetermined function after the registration of the password, the wearable module 30 locks or unlocks the function by confirming that the received password is registered as the password associated with the mobile device 10 of the request source.

Next, the blocks of the mobile device 10 and the wearable module 30 will be described. The mobile device 10 has a short-range wireless communication section 11, an input section 12 (a terminal-side reception means), a functional section 13 (a terminal-side functional means), a chip section 14, a list retaining section 15 (a terminal-side permission information retaining means), and a lock control section 16 (a terminal-side control means).

The short-range wireless communication section 11 is a communication interface for performing short-range communication with the wearable module 30. For example, there are Bluetooth (registered trademark) low energy (BLE), near field communication (NFC), etc. When the short-range communication with the wearable module 30 is performed, the short-range wireless communication section 11 first establishes a connection with the wearable module 30. Specifically, the short-range wireless communication section 11 transmits a connection password for communicating with the wearable module 30 to the wearable module 30. When it is determined that a result of the short-range wireless communication section 11 transmitting the connection password to the wearable module 30 indicates that the connection password in the wearable module 30 is a valid password, the short-range wireless communication section 11 receives a notification indicating that the connection is possible from the wearable module 30. When the short-range wireless communication section 11 receives the notification, the short-range wireless communication section 11 can transmit information to the wearable module 30 and receive information from the wearable module 30. That is, the mobile device 10 and the wearable module 30 are in a state in which they are connected (linked) to each other.

The above-mentioned connection password may be input by the input section 12 or pre-retained by the short-range wireless communication section 11. Also, when the short-range wireless communication section 11 retains the connection password of the wearable module 30 and receives a password and a connection requested from the wearable module 30, it may be determined whether the connection is possible on the basis of the retained password. When the connection is possible, a state in which the connection with the wearable module 30 is made may be provided by providing a notification indicating that the connection is possible. Also, the short-range wireless communication section 11 transmits information (terminal identification information) for uniquely identifying the mobile device 10 to the wearable module 30. Here, the terminal identification information is subscriber information, a physical ID of the mobile device 10, or the like. The short-range wireless communication section 11 transmits a locking password input by the input section 12 to be described below to the wearable module 30. Also, the short-range wireless communication section 11 transmits a password registration request to the wearable module 30.

The input section 12 is a part for receiving information of registration reception or the like of a locking/unlocking password from the user of the mobile device 10. Specifically, the input section 12 is a user interface (an operation screen, an operation key, or the like) for receiving an input of a password, a registration request, an unlocking request, or the like. The input section 12 receives an input of a password for locking/unlocking a function provided in the mobile device 10 and an input of a password for locking/unlocking the function of the wearable module 30. Also, the input section 12 also receives an input of a type of function (chip) serving as a target to be locked/unlocked. Also, the input section 12 receives an input of a password setting request by biometric authentication for the wearable module 30 or a connection password for connecting to the wearable module 30. Also, the input section 12 receives an input related to a request for executing a function to be executed by the functional section 13 or a function to be executed by the wearable module 30. The functional section 13 or the lock control section 16 is notified of information such as a password or a request for which the input section 12 receives an input according to the information or request. Details will be described below.

The functional section 13 is a part for executing the function using the chip section 14 to be described below. Specifically, the functional section 13 exhibits the function by operating a chip (an SE chip and an RF chip) included in the chip section 14. For example, the functional section 13 executes contactless communication (short-range wireless communication) through collaboration with the short-range wireless communication section 11 by operating the RF chip according to an operation in the mobile device 10. Alternatively, the functional section 13 stores information input from the input section 12 or the short-range wireless communication section 11 in the SE chip and reads information from the SE chip to output the read information to the short-range wireless communication section 11.

Also, the function to be executed by the functional section 13 can be locked and unlocked. Also, a unit for locking the function can be set for each chip (each of the SE chip and the RF chip) included in the chip section 14. That is, the functional section 13 executes a plurality of functions different from each other for each unit for locking. Thus, the mobile device 10 includes a plurality of terminal-side functional means. However, it may be unnecessary for the number of units (terminal-side functional means) for locking to be two or more and the number of units (terminal-side functional means) for locking may be one. The functional section 13 executes a function not in a locked state and does not execute a function in the locked state by referring to information indicating a lock state corresponding to the chip related to the function to be executed included in a list retained by a list retaining section 15 to be described below before the function is executed. Specific locking and unlocking methods will be described below.

The chip section 14 is a chip such as an RF chip which is a chip for contactless communication or an SE chip capable of securely storing data. In the present embodiment, the chip section 14 has a plurality of types of chips such as the SE chip and the RF chip.

The list retaining section 15 is a part for retaining a list of passwords for locking/unlocking functions to be executed by the mobile device 10. An example of the list retained by the list retaining section 15 is illustrated in FIG. 2(A). As illustrated in FIG. 2(A), the list retained by the list retaining section 15 is obtained by associating a type of chip serving as a target to be locked/unlocked, a locked/unlocked state, and a locking/unlocking password. That is, the list retaining section 15 retains a password for each type of chip (that is, in a functional means unit). In the example of FIG. 2(A), it is shown that the RF chip is in the locked state and the password for locking/unlocking the RF chip is "0000" and it is shown that the SE chip is in the locked state and the password for locking/unlocking the SE chip is "1111."

Returning to FIG. 1, the lock control section 16 locks or unlocks a function to be executed by the functional section 13 on the basis of the locking/unlocking password input to the input section 12 and the password of the list retained by the list retaining section 15 and transmits a lock or unlock request including the password to the wearable module 30 via the short-range wireless communication section 11. Specifically, the lock control section 16 inputs a locking/unlocking password, a type of chip, and a lock or unlock request (whether to lock or unlock) to the input section 12 according to an input operation of a user. The lock control section 16 determines whether a password corresponding to the input type of chip in the list retained by the list retaining section 15 matches the input locking/unlocking password. When they match, the lock control section 16 performs a process of changing the lock state corresponding to the input type of chip within the list retained by the list retaining section 15 to information according to the lock or unlock request. For example, the lock control section 16 changes the lock state of the list retained by the list retaining section 15 corresponding to the input type of chip to a locked state in the case of the lock request and the lock control section 16 changes the lock state of the list retained by the list retaining section 15 corresponding to the input type of chip to an unlocked state in the case of the unlock request.

Also, the lock control section 16 may be configured to not only change the lock state for the list retained by the list retaining section 15, but also lock/unlock the chip of the chip section 14. For example, the lock control section 16 transmits a lock/unlock command to a circuit of a chip of the chip section 14. As a result of this, when the chip of the chip section 14 is in the locked state, no response (no answer) is given even when another external apparatus issues a predetermined request for the chip of the chip section 14 (for example, a read request or the like for the chip). Also, if a password for locking/unlocking the chip of the chip section 14 is necessary, the lock control section 16 may transmit a password (for example, a locking/unlocking password ("0000" or "1111") input to the input section 12) when a lock/unlock request command is transmitted to the circuit of the chip of the chip section 14.

After changing the lock state of the list retained by the list retaining section 15 as mentioned above, the lock control section 16 transmits the locking/unlocking password input to the input section 12 to the wearable module 30 according to short-range communication via the short-range wireless communication section 11, and issues a lock or unlock request. Also, the lock control section 16 transmits terminal identification information of its own device (the mobile device 10) to the wearable module 30 according to short-range communication via the short-range wireless communication section 11 together with the request.

Also, the lock control section 16 sets the password for the list retaining section 15 on the basis of the locking/unlocking password and the type of chip input to the input section 12 according to an operation input of the user. Specifically, the lock control section 16 inputs a password setting request to the input section 12 together with the locking/unlocking password and the type of chip. The lock control section 16 associates and registers the input type of chip and the input password for the list retained by the list retaining section 15. After the registration for the list retaining section 15 is completed, the lock control section 16 transmits the type of chip and the locking/unlocking password to the wearable module 30 via the short-range wireless communication section 11 and performs a locking/unlocking password setting request. Also, the lock control section 16 transmits terminal identification information of its own device (the mobile device 10) to the wearable module 30 via the short-range wireless communication section 11 together with the request. The lock control section 16 issues a password setting request by biometric authentication in which the wearable module 30 can independently perform locking after the password setting request for the wearable module 30 is issued.

Next, blocks of the wearable module 30 will be described. The wearable module 30 has a short-range wireless communication section 31 (a reception means), a special input section 32 (a second control means), a functional section 33 (a functional means), a chip section 34, a list retaining section 35 (a permission information retaining means), and a lock control section 36 (a control means or a second control means).

The short-range wireless communication section 31 is a communication interface for short-range communication with the mobile device 10. For example, there is BLE or NFC. When the short-range communication with the mobile device 10 is performed, the short-range wireless communication section 11 first establishes a connection with the mobile device 10. The short-range wireless communication section 31 has a connection password for determining whether to permit the connection with each mobile device 10. The short-range wireless communication section 31 receives the connection password from the mobile device 10. The short-range wireless communication section 31 collates the connection password received from the mobile device 10 and a retained connection password. When the two passwords match, the short-range wireless communication section 31 enables communication with the mobile device 10 and the wearable module 30 and notifies the mobile device 10 transmitting the connection password of the fact that the connection is possible. As a result, the mobile device 10 and the wearable module 30 are connected to each other. The short-range wireless communication section 31 can establish connections with a plurality of mobile devices 10.

The short-range wireless communication section 31 receives a locking/unlocking password from the mobile device 10 and receives a locking/unlocking password setting request from the mobile device 10. Also, the short-range wireless communication section 31 receives the terminal identification information of the mobile device 10 together with the above-mentioned information from the mobile device 10. The short-range wireless communication section 31 notifies the lock control section 36, etc. of the received information (details will be described below). Also, the short-range wireless communication section 31 may specify the terminal identification information of the mobile device 10 on the basis of the connection to the mobile device 10 (in this case, the transmission of the terminal identification information together with the above-mentioned information from the mobile device 10 is unnecessary). Also, the short-range wireless communication section 31 transmits the result (for example, information indicating whether the password setting request for the locking/unlocking has succeeded) of the request from the mobile device 10 to the mobile device 10. Also, the short-range wireless communication section 31 receives various types of requests such as a request for executing a function and a password setting request by biometric authentication from the mobile device 10.

The special input section 32 receives the input of the password by the biometric authentication according to the password setting request by the biometric authentication from the mobile device 10. As an example of the password by the biometric authentication, there is a password based on biometric authentication information such as a fingerprint or an iris in the eye. As a specific example of the special input section 32, there is an apparatus for reading biometric authentication information such as the fingerprint or the iris. The special input section 32 reads and inputs the biometric authentication information of the user. The special input section 32 notifies the lock control section 36 to be described below of the input biometric authentication information. Also, in this case, the lock control section 36 registers the password based on the biometric authentication information input to the special input section 32 and collates the password based on the biometric authentication information input to the special input section 32 according to an operation of the user and the password retained by the list retaining section 35 to be described below. Also, it is possible to read (input) the biometric authentication information in a method similar to the conventional method.

The functional section 33 is a part for executing a function using the chip section 34 to be described below. Specifically, the functional section 33 causes the function to be exhibited by operating the chip (the SE chip and the RF chip) included in the chip section 34. For example, the functional section 33 causes contactless communication (short-range wireless communication) to be executed through collaboration with the short-range wireless communication section 31 by operating the RF chip according to an operation in the wearable module 30. Alternatively, the functional section 33 stores information input from the special input section 32 or the short-range wireless communication section 31 in the SE chip and reads information from the SE chip to output the read information to the short-range wireless communication section 31.

Also, the function to be executed by the functional section 33 can be locked and unlocked. Also, the unit for locking the function can be set for each chip (SE chip and RF chip) included in the chip section 34. That is, the functional section 33 executes a plurality of functions different from each other for each unit for locking. Thus, the wearable module 30 includes a plurality of functional means. However, it is unnecessary for the number of units (functional means) for locking to be two or more and the number of units (functional means) for locking may be one. The functional section 33 executes a function not in the locked state and does not execute a function in the locked state by referring to information indicating the lock state corresponding to the chip related to the function to be executed included in the list retained by the list retaining section 35 to be described below before the function is executed. Specific locking and unlocking methods will be described below.

The chip section 34 is a chip such as an RF chip which is a chip for contactless communication or an SE chip capable of securely storing data. In the present embodiment, the chip section 34 has a plurality of types of chips such as the SE chip and the RF chip.

The list retaining section 35 is a part for retaining a list of passwords for locking/unlocking functions to be executed by the wearable module 30. There are two types of lists retained by the list retaining section 35. The list retaining section 35 has a list based on the password and the type of chip received from the mobile device 10 and a list based on the password based on the information input to the special input section 32 and the type of chip.

Examples of lists retained by the list retaining section 35 are illustrated in FIGS. 2(B) and 2(C). FIG. 2(B) is the list based on the password and the type of chip received from the mobile device 10. The list based on the password and the type of chip received from the mobile device 10 is associated with the type of mobile device 10 (terminal identification information), a type of chip serving as a target to be locked/unlocked, a connection state, and a locking/unlocking password. Here, the terminal identification information is information for identifying each mobile device 10 and an ID or subscriber information of each mobile device 10. This terminal identification information is information capable of being received by the wearable module 30 when the mobile device 10 and the wearable module 30 are in a connected state. Information of the connection state is registered as a "connected" state in the connection state of the above-mentioned list when the wearable module 30 is connected to the mobile device 10 and registered as a "disconnected" state in the connection state of the above-mentioned list when they are not in the connected state. The connection state of the list is updated by the short-range wireless communication section 31 at the timing at which the connection state changes. Thus, the list retaining section 35 retains the password for each mobile device 10 (that is, each terminal apparatus) and for each type of chip (that is, a functional means unit). In the example of FIG. 2(B), it is shown that a locking/unlocking password for the RF chip from terminal A is "0000" and terminal A is connected. Also, it is shown that a locking/unlocking password for the SE chip from terminal B is "1111" and terminal B is in a disconnected state (a non-connection state).

FIG. 2(C) is a list based on a password based on biometric authentication information input to the special input section 32 and a type of chip. In the list based on the password based on the biometric authentication information input to the special input section 32 and the type of chip, a type of chip serving as a target to be locked/unlocked, a locked/unlocked state, and a locking/unlocking password are associated. In the example of FIG. 2(C), a password for locking/unlocking the RF chip and the SE chip is "AAAA." Also, the password may be different for each chip. It is shown that the RF chip and the SE chip are in the locked state. Also, the above-mentioned password "AAAA" is a password generated by the lock control section 36 converting the password based on the information input to the special input section 32.

Returning to FIG. 1, the lock control section 36 locks or unlocks the function to be executed by the functional section 33 on the basis of the password based on the biometric authentication information input to the special input section 32 and the information of the list retained by the list retaining section 35. Specifically, the lock control section 36 determines whether the password corresponding to each type of chip in the list retained by the list retaining section 35 matches the input password. When they match, the lock control section 36 performs a process of changing a state corresponding to a type of chip corresponding to the matching password within the list retained by the list retaining section 35. For example, the lock control section 36 changes the state to the locked state when the state is the unlocked state and changes the state to the unlocked state when the state is the locked state. Alternatively, the state may be uniformly set to either the locked state or the unlocked state without inverting the lock state as mentioned above. Also, when a lock or unlock request (whether to lock or unlock) is input, the lock state may change according to the request.

Also, the lock control section 36 locks or unlocks a function to be executed by the functional section 33 on the basis of the locking/unlocking password and the type of chip received from the mobile device 10 via the short-range wireless communication section 31 and the terminal identification information which is identification information of the mobile device 10. Specifically, the lock control section 36 acquires a password corresponding to the received terminal identification information and the received type of chip (that is, a password associated with the mobile device 10 of a request source) from the list retained by the list retaining section 35. The lock control section 36 determines whether the password acquired from the list matches the password received from the mobile device 10. When they match, the lock control section 36 performs a process of changing a state corresponding to an input type of chip within the list retained by the list retaining section 35. The lock control section 36 changes the state to the locked state when the password received from the mobile device 10 is for locking and changes the state to the unlocked state when the password is for unlocking.

Also, the lock control section 36 may not only change the lock state for the list retained by the list retaining section 35, but also lock/unlock the chip of the chip section 34. For example, the lock control section 36 transmits a lock/unlock command to a circuit of a chip of the chip section 34. As a result of this, when the chip of the chip section 34 is in the locked state, no response (no answer) is given even when another external apparatus issues a predetermined request for the chip of the chip section 34 (for example, a read request or the like for the chip). Also, if a password for locking/unlocking the chip of the chip section 34 is necessary, the lock control section 36 may transmit a password (for example, a password "AAAA" based on biometric authentication information input to the special input section 32) when a lock/unlock request command is transmitted to the circuit of the chip of the chip section 34.

Also, the lock control section 36 receives a password setting request by the biometric authentication information from the mobile device 10 via the short-range wireless communication section 31. When the request is received, the lock control section 36 performs control for causing the biometric authentication information to be input to the special input section 32. When the biometric authentication information is input from the special input section 32, the lock control section 36 converts the input biometric authentication information into a password, associates the password obtained through the conversion and each type of chip, and registers an association result in the list retaining section 35 (the list of FIG. 2(C)). Also, at the time of the registration, the information of a type of chip may be input according to the user's operation and a password based on the biometric authentication information may be registered in the list retaining section 35 for each type of chip.

Also, when the lock control section 36 receives the password and the type of chip received from the mobile device 10 and the terminal identification information which is the identification information of the mobile device 10 and receives the password registration request, the terminal identification information, the type of chip, and the password are associated and registered in the list retaining section 35 (the list of FIG. 2(B)).

(Description of Hardware Configuration Diagrams)

Figure 3:
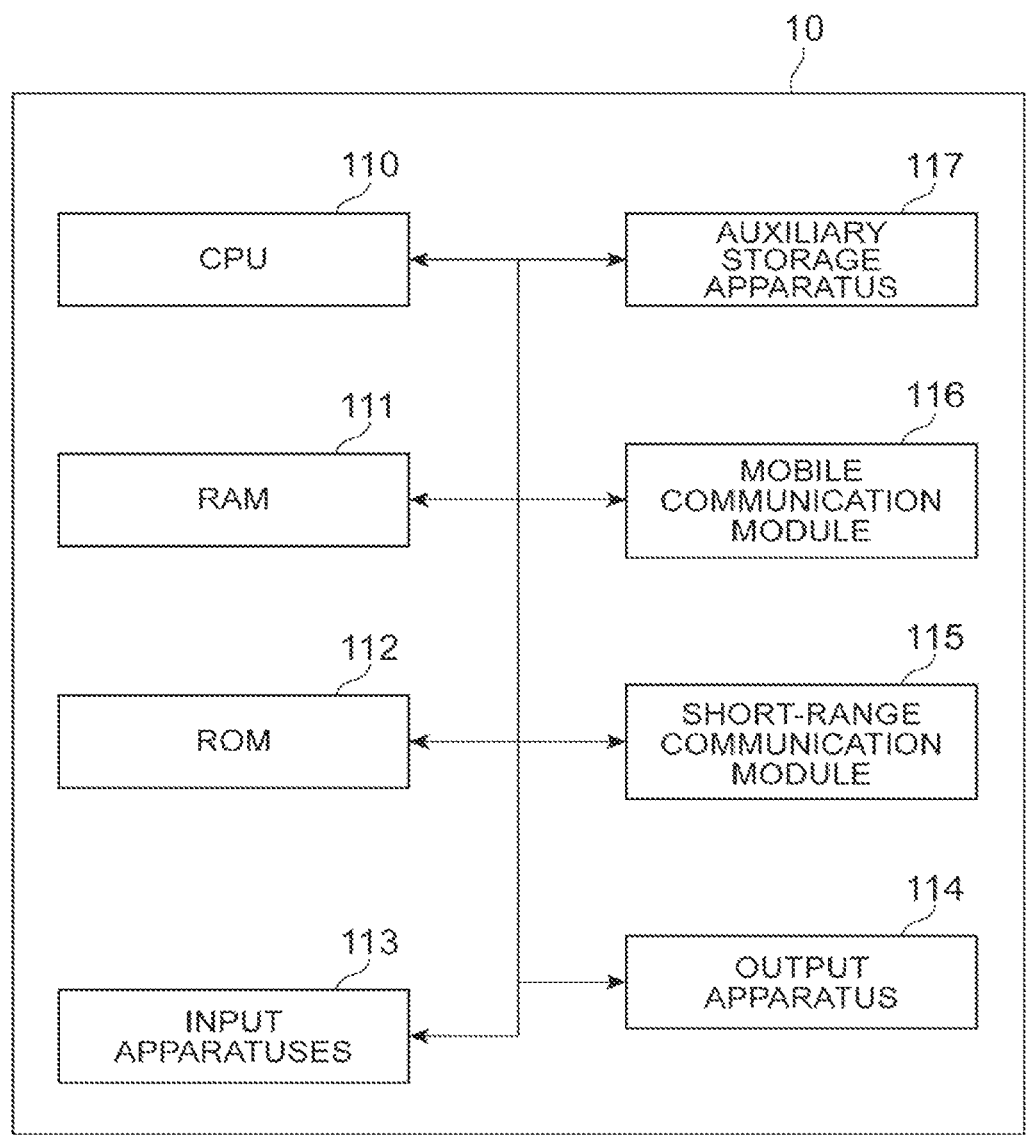
FIG. 3 is a diagram illustrating a hardware configuration of a mobile device (10).

Next, hardware configurations of the mobile device 10 and the wearable module 30 will be described. First, the hardware configuration diagram of the mobile device 10 will be described. As illustrated in FIG. 3, the mobile device 10 is configured as a computer system including one or more CPUs 110, a RAM 111 and a ROM 112 which are main storage apparatuses, input apparatuses 113 such as a keyboard and a mouse which are input devices, an output apparatus 114 such as a display, a short-range communication module 115 which is a communication module for short-range communication such as NFC or BLE, a mobile communication module 116 which is a module for communicating with various types of servers, etc. and is a data transmission/reception device such as a network card, an auxiliary storage apparatus 117 such as a semiconductor memory, etc. The mobile device 10 is implemented by causing predetermined computer software to be read on the hardware such as the CPU 110 and the RAM 111 illustrated in FIG. 3, operating the input apparatuses 113, the output apparatus 114, the short-range communication module 115, and the mobile communication module 116 under control of the CPU 110, and reading and writing data from and to the RAM 111 or the auxiliary storage apparatus 117.

Figure 4:
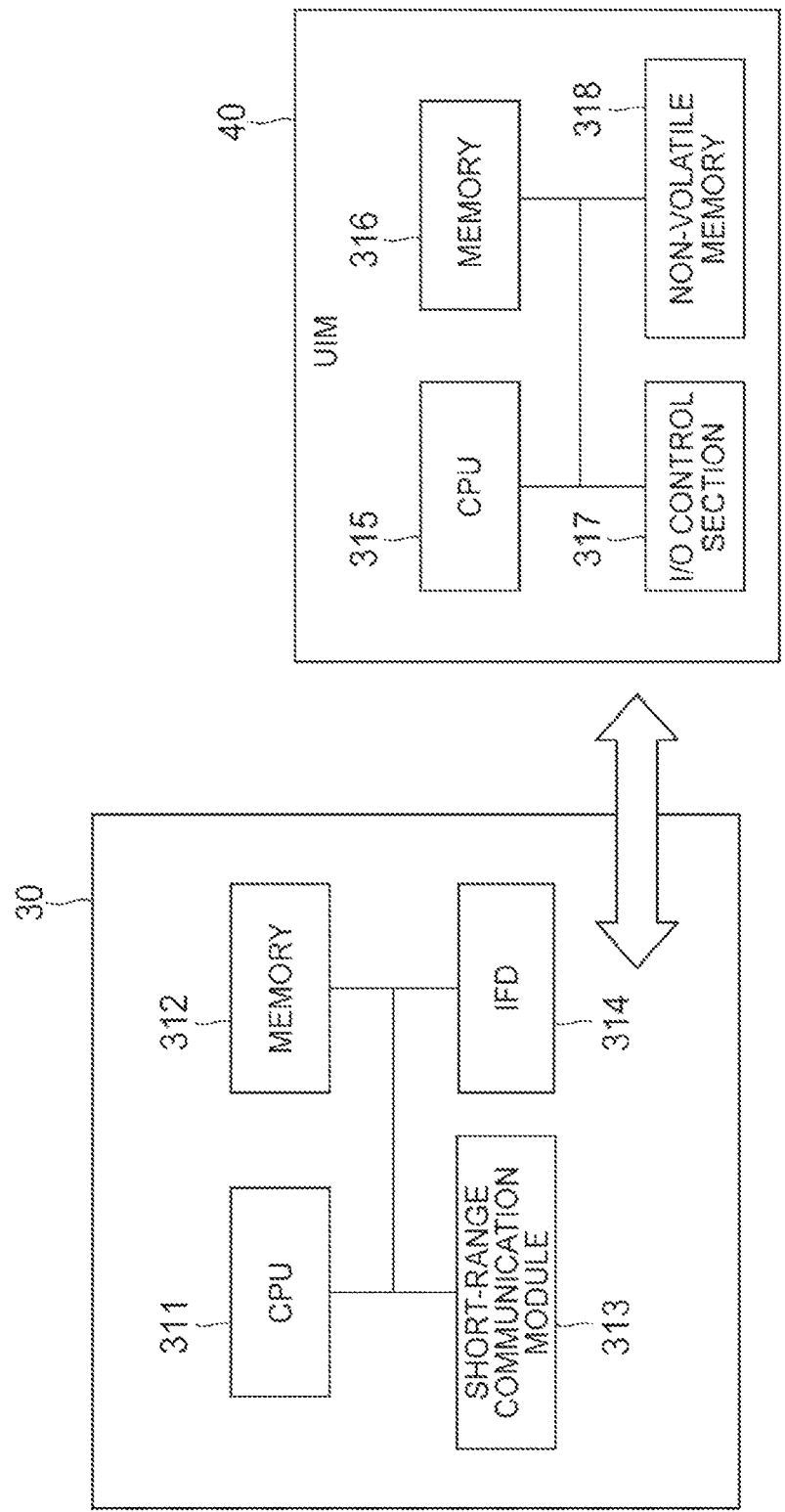
FIG. 4 is a diagram illustrating a hardware configuration of a wearable module (30).

Next, the hardware configuration diagram of the wearable module 30 will be described. As illustrated in FIG. 4, the wearable module 30 is physically constituted of, for example, a CPU 311, a memory 312 such as a ROM or a RAM, a short-range communication module 313, and an interface device (IFD) 314 for exchanging data with a UIM 40.

Also, the UIM 40 is physically constituted of, for example, a CPU 315, a memory 316 such as a ROM or a RAM, a non-volatile memory 318 such as an EEPROM, and an I/O control section 317 for controlling the exchange of data with the wearable module 30.

Figure 5:
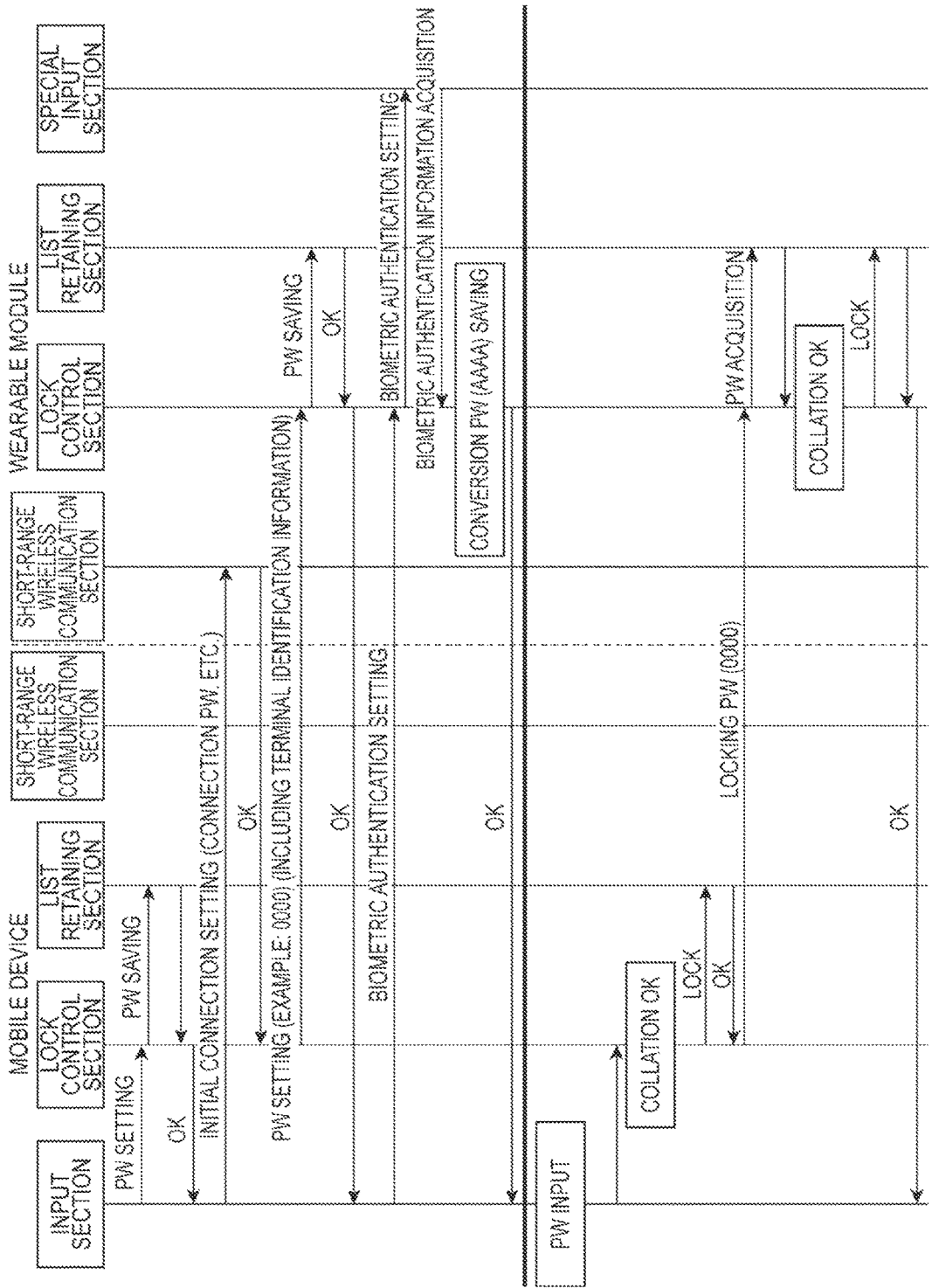
FIG. 5 is a sequence diagram of a password registration process/locking process.
Figure 6:
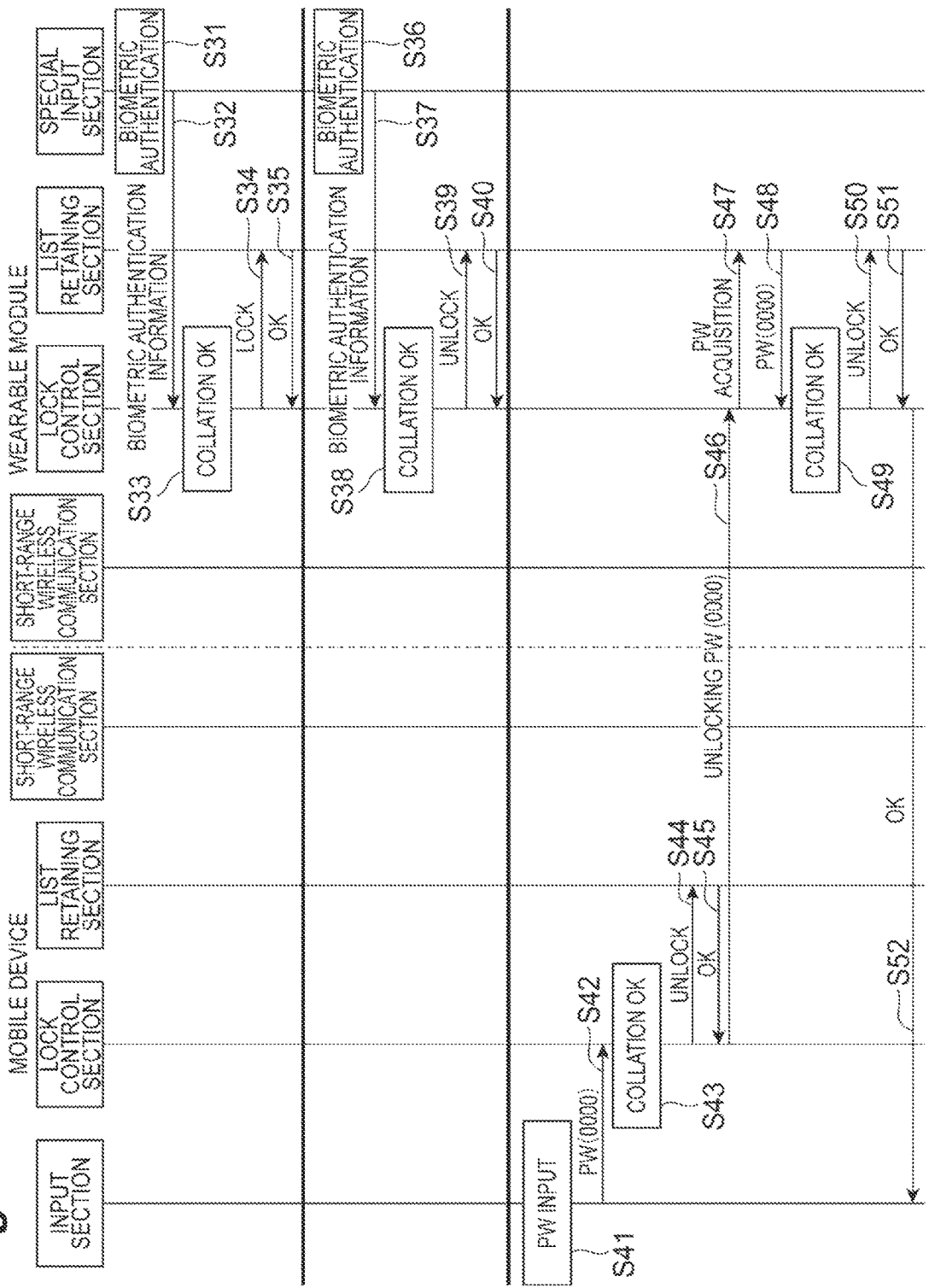
FIG. 6 is a sequence diagram of an unlocking process according to the first embodiment of the present invention.
Figure 7:
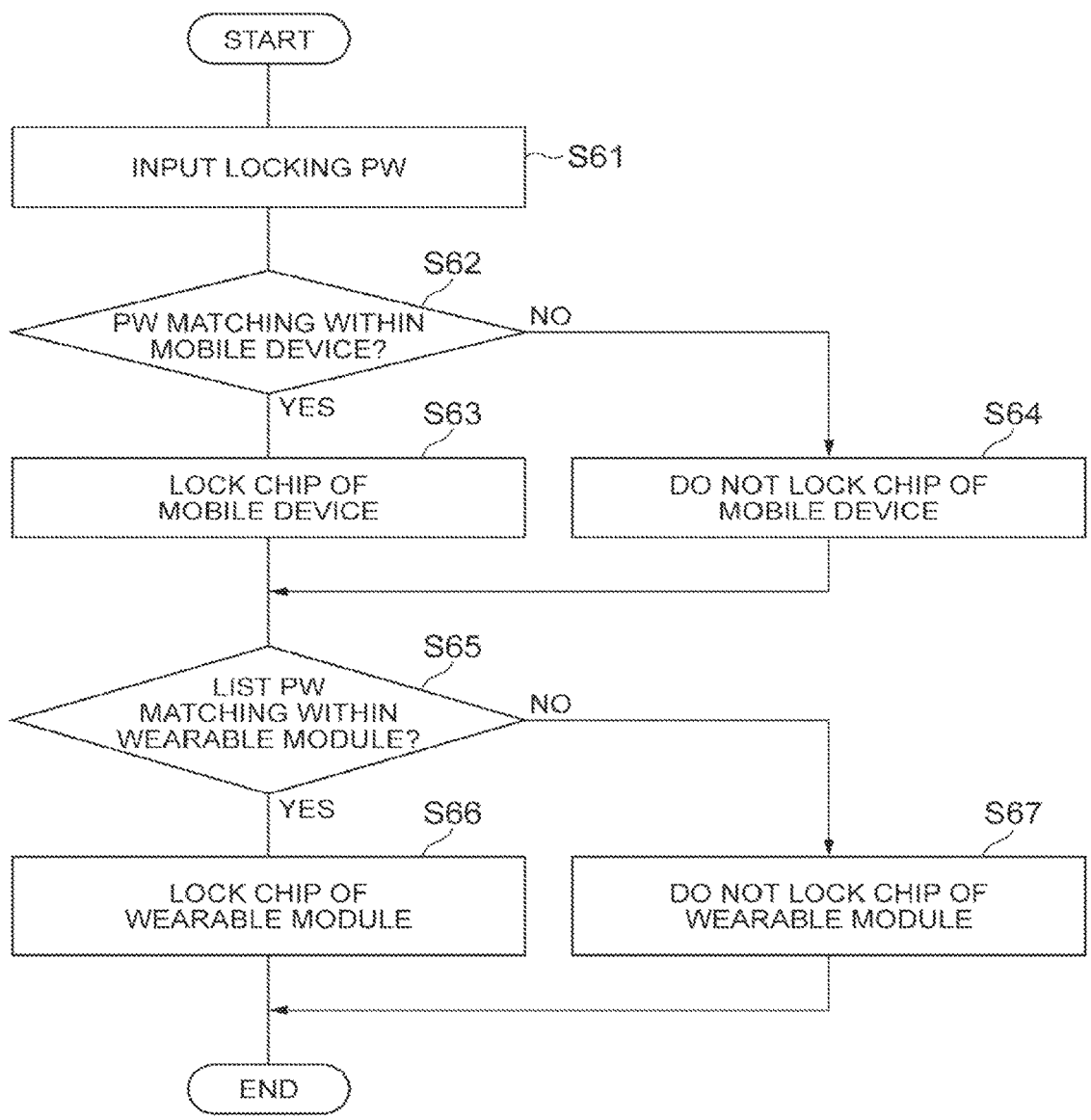
FIG. 7 is a flowchart of the locking process according to the first embodiment of the present invention.
Figure 8:
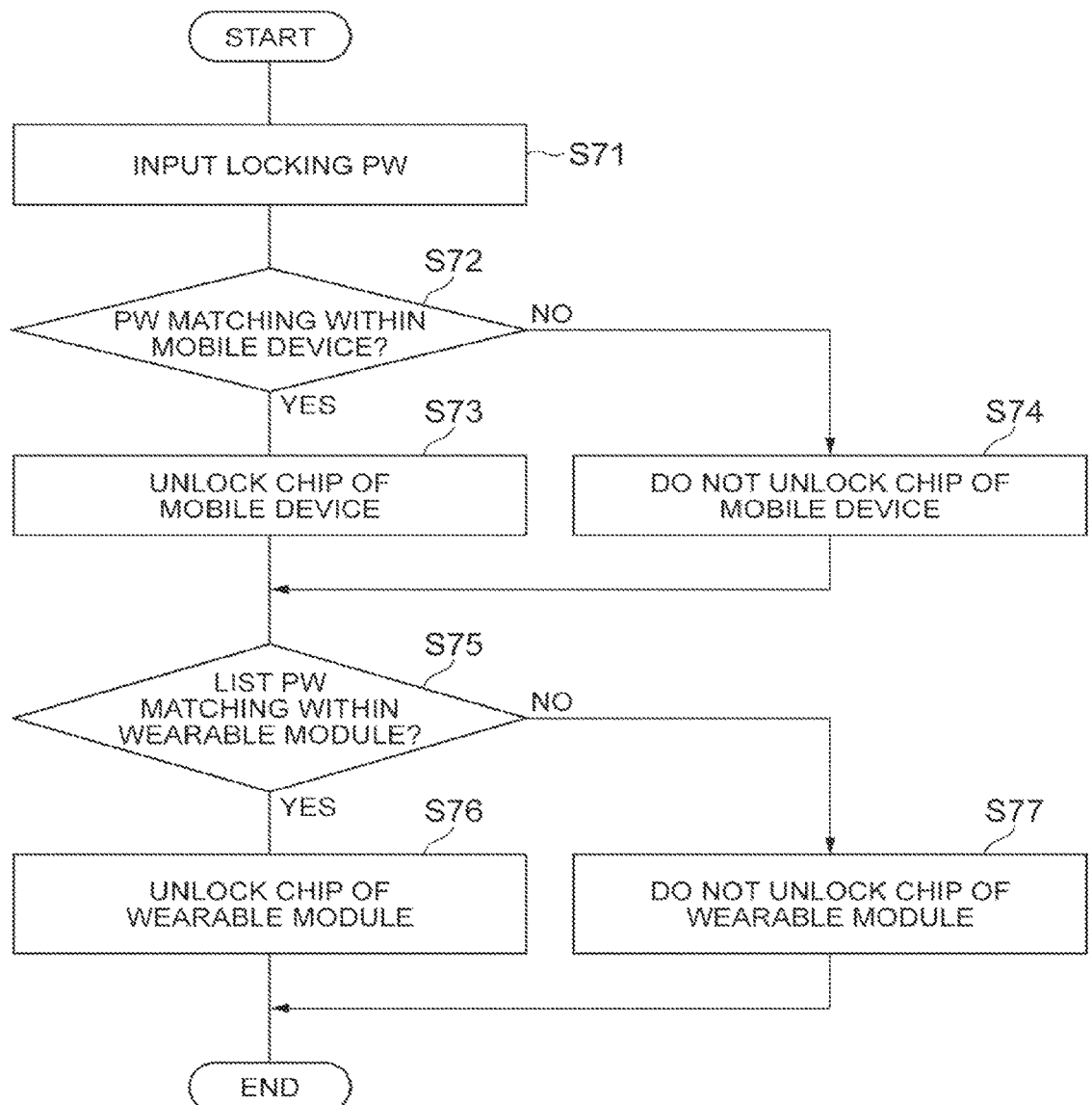
FIG. 8 is a flowchart of the unlocking process according to the first embodiment of the present invention.

Next, a process and an operation to be executed in a function control system 1 according to the first embodiment will be described using sequence diagrams of FIGS. 5 and 6 and flowcharts of FIGS. 7 and 8. The sequence diagram illustrated in FIG. 5 is a sequence diagram of a password setting process for locking/unlocking the function of the mobile device 10 and the function of the wearable module 30 and a locking process of the mobile device 10 and the wearable module 30.

First, the input section 12 receives inputs of a request for setting a locking/unlocking password, the locking/unlocking password, and a type of chip according to an input operation of the user (step S1). After the input section 12 receives the inputs in step S1, the input section 12 notifies the lock control section 16 of the request for setting the locking/unlocking password, the locking/unlocking password, and the type of chip. The lock control section 16 registers/saves information obtained by associating the locking/unlocking password and the type of chip for the list (the list of FIG. 2(B)) retained by the list retaining section 15 (step S2). When it is confirmed that the registration/saving for the list retained by the list retaining section 15 is completed normally (step S3), the lock control section 16 notifies the input section 12 of the fact that the registration for the list retained by the list retaining section 15 is performed (step S4).

When a connection password (connection PW) for the wearable module 30 is input to the input section 12 according to the input operation of the user after the input section 12 receives information indicating that the registration for the list retained by the list retaining section 15 is performed from the lock control section 16, the connection password is transmitted to the short-range wireless communication section 31 of the wearable module 30 via the short-range wireless communication section 11 of the mobile device 10 (step S5).

The short-range wireless communication section 31 transmits information (for example, OK) indicating that collation is completed normally to the mobile device 10 when a result of collating the connection password received from the mobile device 10 indicates that the connection password matches a password retained by the short-range wireless communication section 31 (step S6).

The lock control section 16 transmits the type of chip, the locking/unlocking password (for example, "0000"), and the terminal identification information to the short-range wireless communication section 31 of the wearable module 30 via the short-range wireless communication section 31 and issues a password registration request (step S7).

When the lock control section 36 of the wearable module 30 receives the type of chip, the password (for example, "0000"), and the terminal identification information via the short-range wireless communication section 31 and receives the request for setting the locking/unlocking password, information obtained by associating the type of chip, the locking/unlocking password, and the terminal identification information is registered for the list of the list retaining section 35 (step S8).

The lock control section 36 notifies the mobile device 10 of the fact that the registration for the list is completed normally when the registration for the list is completed normally (step S9) and notifies the chip of the wearable module 30 of a target of a password request from the mobile device 10 of information indicating that a password by biometric authentication is not set when the password by the biometric authentication is not set (step S10).

When the mobile device 10 receives the information indicating that the password by the biometric authentication is not set from the wearable module 30, a password setting request by the biometric authentication is issued to the wearable module 30 via the short-range wireless communication section 11 if the input section 12 receives an input operation of the biometric authentication setting request according to the received information (step S11).

When the lock control section 36 receives the password setting request by the biometric authentication via the short-range wireless communication section 31, the lock control section 36 notifies the special input section 32 of the password setting request by the biometric authentication (step S12). The special input section 32 receives the input of the biometric authentication information by the user's operation in response to the password setting request by the biometric authentication and notifies the lock control section 36 of the received biometric authentication information after receiving the input of the biometric authentication information (step S13).

The lock control section 36 registers information obtained by associating the password (for example, "AAAA") into which the biometric authentication information is converted and the type of chip of the password setting request from the mobile device 10 for the list (the list of FIG. 2(C)) of the list retaining section 35 (step S14). When the registration process for the list retaining section 35 is completed normally, the lock control section 36 notifies the mobile device 10 of the fact that the registration process is completed normally (step S15) and completes the locking/unlocking password setting process.

Next, the locking process from the mobile device 10 will be described. When the input section 12 of the mobile device 10 receives inputs of the lock request and the locking/unlocking password ("0000") according to an operation input by the user (step S16: terminal-side reception step), the input section 12 notifies the lock control section 16 of the lock request, the locking/unlocking password, and the type of chip of the lock request target (step S17). The lock control section 16 acquires the password of a type of chip of the lock request target from the list (the list of FIG. 2(A)) of the list retaining section 15, collates the acquired password and the locking/unlocking password received from the input section 12 (step S18), and performs a process of changing the lock state for the list of the list retaining section 15 when the two passwords match (step S19: terminal-side control step). Specifically, the lock control section 16 changes the lock state corresponding to a type of chip identical with the type of chip received from the input section 12 in the list retained by the list retaining section 15 to a "locked" state. When the process of changing the above-mentioned lock state is completed normally (step S20), the lock control section 16 transmits the locking/unlocking password, the type of chip of the lock request target, and the terminal identification information to the wearable module 30 via the short-range wireless communication section 11 and issues the lock request (step S21: terminal-side control step).

In response to the above-mentioned request, the lock control section 36 receives the locking/unlocking password, the type of chip of the lock request target, and the terminal identification information via the short-range wireless communication section 31. The lock control section 36 issues a request for acquiring the locking/unlocking password corresponding to the terminal identification information and the type of chip of the lock request target from the list (the list of FIG. 2(B)) retained by the list retaining section 35 (step S22: reception and control steps). The lock control section 36 acquires the password ("0000") from the list of the above-mentioned list retaining section 35 (step S23).

The lock control section 36 collates the locking/unlocking password acquired from the list of the above-mentioned list retaining section 35 and the locking/unlocking password received from the mobile device 10. When the two passwords match (step S24), the lock control section 36 sets information indicating that locking is set for the list of the above-mentioned list retaining section 35 (step S25: control step). Specifically, the lock control section 36 sets the state of the list of the type of chip of the lock request target to the locked state.

When the setting for the list of the list retaining section 35 is completed normally (step S26), the lock control section 36 completes the locking process by providing a notification indicating that the locking is completed normally from the lock control section 36 to the mobile device 10 (step S27).

Next, a locking process of only the wearable module 30, an unlocking process of only the wearable module 30, and an unlocking process of the mobile device 10 and the wearable module 30 in conjunction will be described using the sequence diagram illustrated in FIG. 6.

First, in steps S31 to S35, the locking process of only the wearable module 30 will be described. When the special input section 32 receives information of biometric authentication (step S31), the biometric authentication information is transmitted from the special input section 32 to the lock control section 36 (step S32). The lock control section 36 converts the biometric authentication information received from the special input section 32. When there is a password matching information into which the biometric authentication information is converted among passwords of the list (the list of FIG. 2(C)) retained by the list retaining section 35 (step S33), the lock control section 36 issues a lock request for a chip corresponding to the password (step S34). Specifically, the lock control section 36 sets the information of the lock state corresponding to the password to the "locked" state within the list retained by the above-mentioned list retaining section 35. When the lock control section 36 completes the lock setting normally (step S35), the locking process of only the wearable module 30 is completed.

Next, the unlocking process of only the wearable module 30 in steps S36 to S40 will be described. When the special input section 32 receives biometric authentication information according to the user's input operation (step S36), the biometric authentication information is transmitted from the special input section 32 to the lock control section 36 (step S37). The lock control section 36 converts the biometric authentication information received from the special input section 32 and issues an unlock request for a chip corresponding to a password (step S39) when the password matching information into which the biometric authentication information is converted is among the passwords of the list (the list of FIG. 2(C)) retained by the list retaining section 35 (step S38). Specifically, the lock control section 36 sets information of the lock state corresponding to the password to the "unlocked" state within the list retained by the above-mentioned list retaining section 35. When the lock control section 36 completes the setting normally (step S40), the locking process of only the wearable module 30 is completed.

Next, the unlocking process in conjunction with the mobile device 10 in steps S41 to S52 will be described. As a prerequisite, both a chip retained by the mobile device 10 and a chip of the wearable module 30 are assumed to be locked (the state of step S27 of the sequence diagram illustrated in FIG. 5). The input section 12 of the mobile device 10 receives inputs of the lock request and the locking/unlocking password ("0000") according to an operation input by the user (step S41). When the input section 12 receives the inputs, the input section 12 notifies the lock control section 16 of the lock request, the password, and the type of chip of the unlock request target (step S42). The lock control section 16 acquires the password corresponding to a type of chip identical with the type of chip of the unlock request target from the list (the list of FIG. 2(A)) of the list retaining section 15. The lock control section 16 collates the acquired password and the locking/unlocking password received from the input section 12 (step S43) and performs the unlocking process for the chip section 14 when the passwords match (step S44). Specifically, the lock control section 16 changes the lock state corresponding to a type of chip identical with the type of chip received from the input section 12 in the list retained by the above-mentioned list retaining section 15 to the "unlocked state." When the unlocking process is completed normally (step S45), the lock control section 16 transmits the locking/unlocking password, the type of chip of the unlock request target, and the terminal identification information to the wearable module 30 via the short-range wireless communication section 11 and issues the unlock request (step S46).

The lock control section 36 receives the locking/unlocking password, the type of chip of the unlock request target, and the terminal identification information via the short-range wireless communication section 31. Thereafter, the lock control section 36 issues a request for acquiring a password corresponding to the terminal identification information and the type of chip of the unlock request target from the list (the list of FIG. 2(B)) retained by the list retaining section 35 (step S47), and acquires the password ("0000") from the list of the above-mentioned list retaining section 35 (step S48).

The lock control section 36 collates the password acquired from the list of the above-mentioned list retaining section 35 and the password received from the mobile device 10. When the two passwords match (step S49), the lock control section 36 sets a change of the lock state of the list of the list retaining section 35 to the unlocked state (step S50). Specifically, the lock control section 36 sets the lock state of the list of the type of chip of the unlock request target to the "unlocked" state.

When the setting process for the list of the list retaining section 35 is completed normally (step S51), the lock control section 36 provides a notification indicating that unlocking is completed normally from the lock control section 36 to the mobile device 10 (step S52) and completes the unlocking process.

Next, the locking process of the mobile device 10 and the wearable module 30 in conjunction will be described using the flowchart illustrated in FIG. 7.

The input section 12 receives inputs of a lock request, a locking/unlocking password, and a type of chip according to the user's input operation (step S61). When a result of the lock control section 16 determining whether a password corresponding to a type of chip identical with the type of chip received by the input section 12 within the list (the list of FIG. 2(A)) retained by the list retaining section 15 matches the locking/unlocking password received by the input section 12 indicates that two passwords match (step S62: YES), the lock control section 16 executes a process of locking the chip of the mobile device 10 (step S63). The lock control section 16 transmits the terminal identification information, the type of chip, and the locking/unlocking password to the wearable module 30 and issues a lock request to the wearable module 30.

When the password corresponding to the type of chip identical with the type of chip received by the input section 12 within the list retained by the above-mentioned list retaining section 15 does not match the locking/unlocking password received by the input section 12 (step S62; NO), no locking process is performed (step S64). The lock control section 16 transmits the terminal identification information, the type of chip, and the locking/unlocking password to the wearable module 30 and issues the lock request to the wearable module 30.

When the lock request is received from the mobile device 10, the lock control section 36 of the wearable module 30 acquires the password corresponding to the terminal identification information and the type of chip received from the mobile device 10 from the list of the above-mentioned list retaining section 35. The lock control section 36 determines whether the password acquired from the list of the list retaining section 35 matches the locking/unlocking password received from the mobile device 10, performs a process of locking a chip of a lock request target of the wearable module 30 when the two passwords match (step S66) and completes the process.

Also, when the password acquired from the list of the list retaining section 35 does not match the locking/unlocking password received from the mobile device 10, the process is terminated without performing the locking process of the wearable module 30 (step S67). Although the process moves to step S65 after step S64 in the flowchart illustrated in FIG. 7, the process may be terminated without moving to step S65 after step S64.

Thus, when the wearable module 30 has a type of chip identical with the type of chip provided in the mobile device 10 in the function control system 1, the wearable module 30 and the mobile device 10 can perform the locking process in conjunction with each other if the same password is set for the chips.

Next, the unlocking process of the mobile device 10 and the wearable module 30 in conjunction will be described using the flowchart illustrated in FIG. 8.

The input section 12 receives inputs of an unlock request, a locking/unlocking password, and a type of chip according to the user's input operation (step S71). When a result of the lock control section 16 determining whether the password corresponding to the type of chip received by the input section 12 within the list (the list of FIG. 2(A)) retained by the list retaining section 15 matches the locking/unlocking password received by the input section 12 indicates that the two passwords match (step S72: YES), the lock control section 16 executes a process of unlocking the chip of the mobile device 10 (step S73). The lock control section 16 transmits the terminal identification information, the type of chip, and the locking/unlocking password to the wearable module 30 and issues the unlock request to the wearable module 30.

When the password corresponding to the type of chip identical with the type of chip received by the input section 12 within the list retained by the above-mentioned list retaining section 15 does not match the locking/unlocking password received by the input section 12 (step S72; NO), no unlocking process is performed (step S74). The lock control section 16 transmits the terminal identification information, the type of chip, and the locking/unlocking password to the wearable module 30 and issues the unlock request to the wearable module 30.

When the unlock request is received from the mobile device 10, the lock control section 36 of the wearable module 30 acquires the password corresponding to the terminal identification information and the type of chip received from the mobile device 10 from the list of the above-mentioned list retaining section 35, determines whether the password acquired from the list of the list retaining section 35 matches the locking/unlocking password received from the mobile device 10, performs a process of unlocking a chip of an unlock request target of the wearable module 30 when the two passwords match (step S76), and completes the process.

Also, when the password acquired from the list retaining section 35 does not match the locking/unlocking password received from the mobile device 10, the process is terminated without performing the process of unlocking the chip of the wearable module 30 (step S77). Although the process moves to step S75 after step S74 in the flowchart illustrated in FIG. 8, the process may be terminated without moving to step S75 after step S74.

Thus, when the wearable module 30 has a type of chip identical with a type of chip provided in the mobile device 10 in the function control system 1, the wearable module 30 and the mobile device 10 can perform the unlocking process in conjunction with each other if the same password is set for the chips.

Although the wearable module 30 is subjected to lock control from one mobile device 10 in the description using FIGS. 5 to 8, the wearable module 30 can be subjected to lock control from a plurality of different mobile devices 10.

In this case, the above-described control is performed for each of the plurality of different mobile devices 10. Also, in this case, it is possible to set a password differing according to each mobile device 10. The password can be assumed to be used in the lock control in each mobile device 10. For example, the password in one mobile device 10 can be "0000" and the password in another mobile device can be "1111." Also, it is only necessary to set biometric authentication in the wearable module 30 by a request from any mobile device 10.

Second Embodiment

Figure 9:
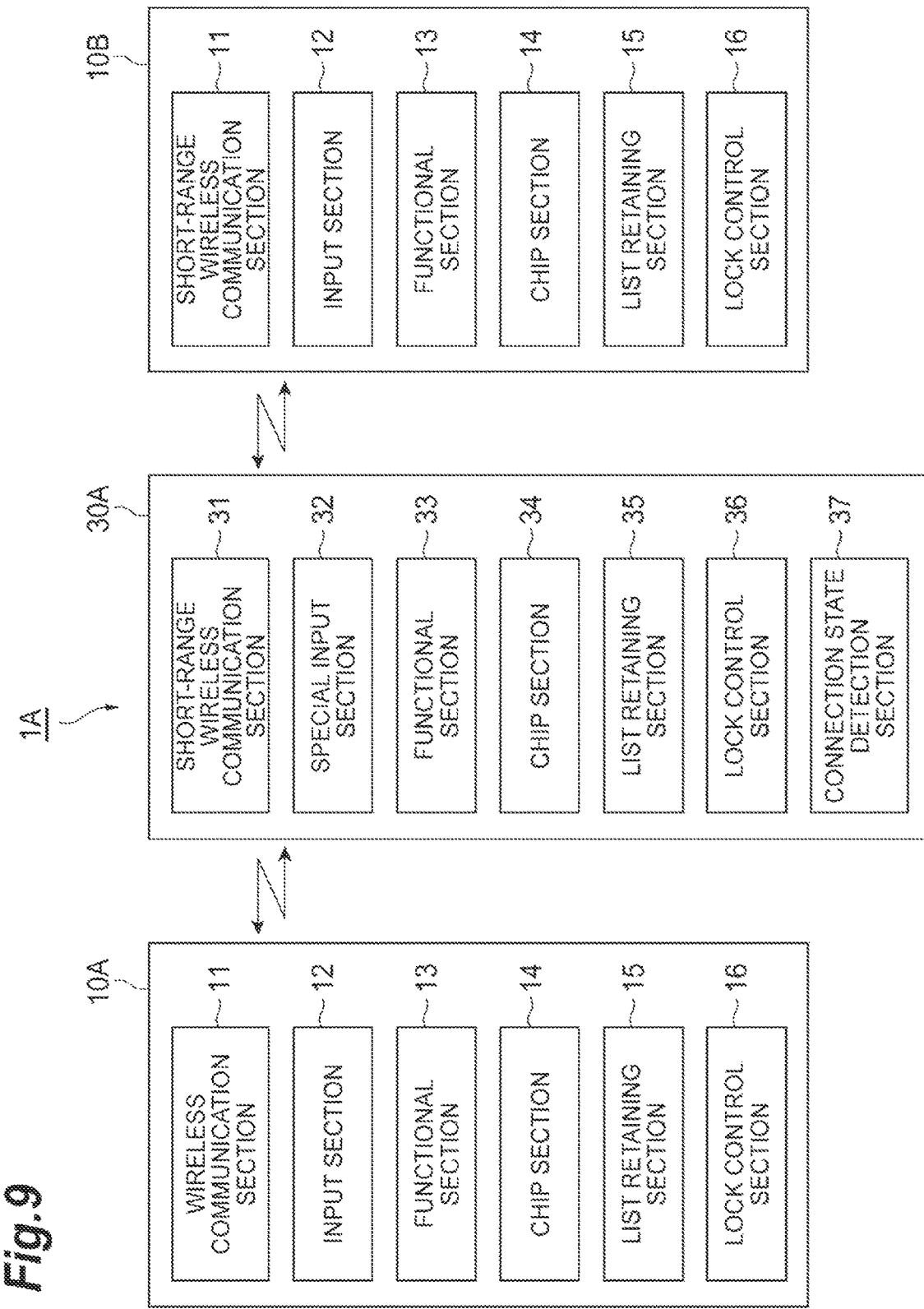
FIG. 9 is a block diagram of a function control system according to a second embodiment of the present invention.

Next, a block diagram of a function control system 1A according to the second embodiment of the present invention is illustrated in FIG. 9. The function control system 1 is configured to include a mobile device 10A, a mobile device 10B, and a wearable module 30A.

In the second embodiment, the lock/unlock request is issued from each of the mobile device 10A and the mobile device 10B to the wearable module 30. For example, when a request for locking a certain chip is issued from the mobile device 10A to the wearable module 30, the wearable module 30 issues a request for locking the chip of a lock request target to the mobile device 10B after the chip of the above-mentioned lock request target retained by the wearable module 30 is locked.

Because each of the mobile device 10A and the mobile device 10B is the same as the mobile device 10 illustrated in FIG. 1, the description of the block diagrams of the mobile device 10A and the mobile device 10B will be omitted. Also, because the wearable module 30A has the same short-range wireless communication section 31, the same special input section 32, the same functional section 33, the same chip section 34, and the same list retaining section 35 as the wearable module 30 illustrated in FIG. 1, the description of the short-range wireless communication section 31, the special input section 32, the functional section 33, the chip section 34, and the list retaining section 35 will be omitted.

The lock control section 36A is only different from the lock control section 36 illustrated in FIG. 1 in that a function to be executed by the functional section 33 is locked or unlocked on the basis of a locking/unlocking password and a type of chip received from the mobile device 10 and terminal identification information which is identification information of the mobile device 10 and is otherwise the same as the lock control section 36 illustrated in FIG. 1. Differences will be specifically described. The lock control section 36A acquires a password corresponding to the received terminal identification information and the received type of chip from a list retained by the list retaining section 35 and determines whether the password acquired from the list matches the locking/unlocking password received from the mobile device 10. When they match, the lock control section 36A performs a process of changing a state corresponding to the input type of chip to a locked state within the list retained by the list retaining section 35. The lock control section 36A not only performs the process, but also acquires a password associated with terminal identification information matching the received type of chip and different from the received terminal identification information of the list from the list retained by the list retaining section 35. The lock control section 36A issues the lock/unlock request to a mobile device (for example, the mobile device 10B when the lock/unlock request is received from the mobile device 10A) identified by the different terminal identification information via the short-range wireless communication section 31.

Also, when a result of a connection state detection section 37 to be described below detecting that a connection is established between the mobile device 10 of a lock/unlock request target and the wearable module 30 from the wearable module 30 indicates a connected state, the lock/unlock request is issued to the mobile device. Also, when the request is made, the lock control section 36A may request the connection state detection section 37 to perform the above-mentioned detection.

The connection state detection section 37 is a part for detecting the connection state with the mobile device 10 serving as the lock/unlock request target by the lock control section 36A. Specifically, the connection state detection section 37 detects the connection state by referring to the connection state of the list retained by the list retaining section 35 corresponding to the mobile device 10 serving as a detection target. The connection state detection section 37 notifies the lock control section 36A of the detected connection state. Also, the connection state detection section 37 may be configured to determine the connection state on the basis of a control signal indicating a response in communication between the short-range wireless communication section 31 and a mobile device (for example, the mobile device 10B) serving as the lock/unlock request target. Further, the connection state detection section 37 may be configured to determine the connection state on the basis of a radio wave intensity or a signal to noise ratio (SNR) at the time of communication between the short-range wireless communication section 31 and the mobile device serving as the lock/unlock request target.

Figure 10:
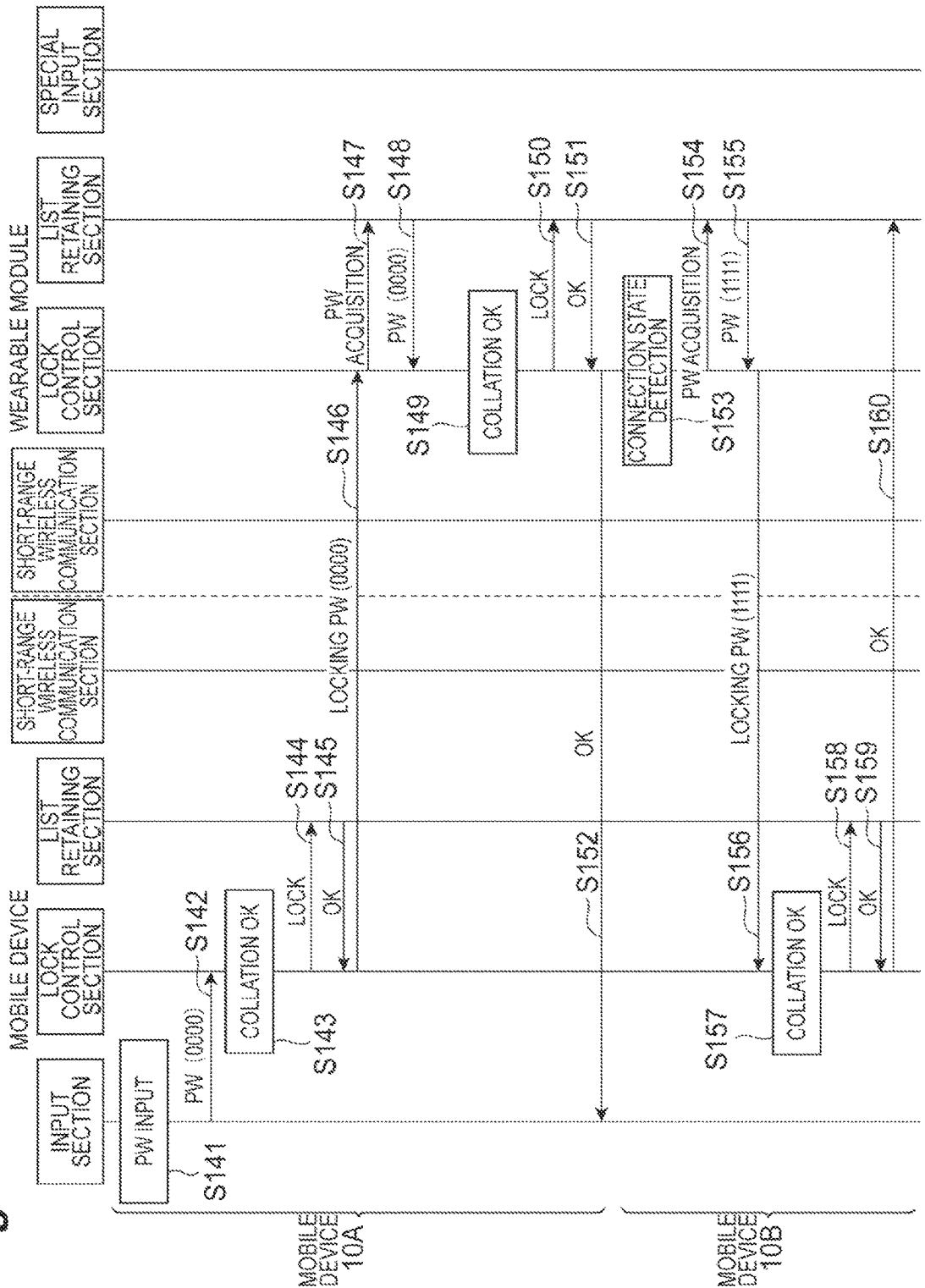
FIG. 10 is a sequence diagram of the locking process according to the second embodiment.

Operation examples of the mobile device 10A, the mobile device 10B, and the wearable module 30A will be described using the sequence diagram illustrated in FIG. 10. The sequence diagram illustrated in FIG. 10 is the sequence diagram of a process of issuing a lock request from the mobile device 10A to the wearable module 30A. As a prerequisite, it is assumed that the mobile device 10A, the mobile device 10B, and the wearable module 30A have a common type of chip (for example, an RF chip), a password setting request is issued to the wearable module 30 in a locking/unlocking password "0000" from the mobile device 10A for the chip, and a password setting request is issued to the wearable module 30 in a password "1111" from the mobile device 10B.

Because processes of steps S141 to S152 are similar to those of steps S16 to S27 of the sequence diagram illustrated in FIG. 5, description thereof will be omitted.

As a result of completing the process of step S152, the lock state of the list (the list of FIG. 2(B)) retained by the list retaining section 35 is set to the "locked" state by the lock control section 36. Thereafter, the wearable module 30A acquires terminal identification information for which a type of chip is the same as a type of chip received from the mobile device 10A from the list of the above-mentioned list retaining section 35. The wearable module 30A specifies terminal identification information corresponding to a mobile device other than the mobile device issuing the lock request within the terminal identification information acquired from the list of the list retaining section 35. Specifically, because the lock request is received from the mobile device 10A, the lock control section 36A specifies the mobile device 10B and the lock control section 36A issues a request for acquiring a password for which terminal identification information is information corresponding to the mobile device 10B and is a type of chip of a lock request target from the mobile device 10A from the list of the list retaining section 35 (step S154) when the connection state detection section 37 detects the connection state with the mobile device 10B (step S153). The lock control section 36 acquires a password "1111" as a result of the above-mentioned acquisition request (step S155).

The lock control section 36A transmits the password "1111" and a type of chip of the lock request target from the mobile device 10A to the mobile device 10B via the short-range wireless communication section 31 and issues a request for locking the chip of the type of chip of the lock request target from the mobile device 10A retained by the mobile device 10B (step S156).

The lock control section 16 of the mobile device 10B receives the locking/unlocking password "1111" from the wearable module 30 and the type of chip of the lock request target from the mobile device 10A via the short-range wireless communication section 11 of the mobile device 10B. Also, the lock control section 16 of the mobile device 10B receives the request for locking the chip of the type of chip of the lock request target from the mobile device 10A retained by the mobile device 10B via the short-range wireless communication section 11 of the mobile device 10B. The lock control section 16 acquires a password corresponding to the type of chip received from the wearable module 30 from the list (the list of FIG. 2(A)) retained by the list retaining section 15, collates the password acquired from the list and the locking/unlocking password received from the wearable module 30, and confirms that the two passwords match (step S157).

When the password acquired from the list matches the locking/unlocking password received from the wearable module 30, the lock control section 16 sets the lock state of the chip of the lock request target in the list retained by the above-mentioned list retaining section 15 to the locked state (step S158). When the setting of the lock state is completed normally (step S159), the lock control section 16 notifies the wearable module 30 of the normal completion (step S160) and completes the process.

Although the special input section 32 receives an input of information of biometric authentication in each embodiment mentioned above, the input of the information based on an operation performed on the wearable module 30 such as a shaking operation may be received. Thus, when information based on an operation performed on the wearable module 30 is input to the special input section 32, the lock control section 36 converts the input information to a password, associates the password obtained through the conversion and each type of chip, and registers an association result in the list retaining section 35 (the list of FIG. 2(C)). Using this password, the lock control section 36 performs a locking/unlocking process on the chip section 34. Also, although the case in which the locking is performed after the information of the biometric authentication is received as a method in which the wearable module 30 can independently execute locking has been described, the locking may be performed on the basis of a threshold value of a predetermined elapsed time. In this case, setting the threshold value of the elapsed time for the wearable module 30 via the input section 12 of the mobile device 10 is considered. Also, when the wearable module 30 has a switch, a button, or the like, the special input section 32 may receive an input of an operation (for example, a pressing operation) on the switch, the button, or the like. Thus, when the special input section 32 receives an input by the above-mentioned switch or button, the lock control section 36 converts the input information into a password, associates the password obtained through the conversion and each type of chip, and registers an association result in the list retaining section 35 (the list of FIG. 2(C)). Using this password, the lock control section 36 performs the locking/unlocking process on the chip section 34. That is, the lock control section 36 performs the locking/unlocking process according to an operation of pressing the above-described switch or button or the like.

(Operations and Effects)

Next, the operations and the effects will be described. The wearable module 30 is a device capable of performing short-range communication with the mobile device 10. The functional section 33 executes a function which can be locked/unlocked. The list retaining section 35 retains a password for permitting the locking/unlocking of the function for each mobile device 10. The short-range wireless communication section 31 receives a request for locking or unlocking the function including the password from the mobile device 10. The lock control section 36 controls the function to be locked or unlocked on the basis of the password included in the request and the password retained in association with the mobile device 10 of a request source of the request by the list retaining section 35.

In this case, because the wearable module 30 retains a password which is information for permitting stop or stop release of the function for each mobile device 10, it is possible to lock/unlock the function for the wearable module 30 according to the mobile device 10 capable of transmitting the password and control a function with a high degree of convenience for the user. For example, it is possible to lock/unlock through a password for each mobile device 10 from a plurality of mobile devices 10 and perform function control with a high degree of convenience for the user.

Also, in the wearable module 30, the functional section 33 includes a plurality of chips different from each other and the list retaining section 35 retains a password for each type of chip. In this case, because the wearable module 30 retains a password for each chip when a plurality of chips are provided, it is possible to perform locking/unlocking in units of chips.

Also, the lock control section 36A of the wearable module 30A transmits a password retained in association with the mobile device 10 by the list retaining section 35 for a mobile device 10 other than the mobile device 10 issuing the lock/unlock request together with locking/unlocking for the chip of the chip section 34. In this case, because the wearable module 30A requests the locking or the unlocking of the function for any terminal device other than the mobile device 10 related to the request received by the short-range wireless communication section 31 among mobile devices 10 in which the permission information of the function for which the locking or the unlocking of the function is requested is defined, the mobile device 10 can collectively issue the request for locking or unlocking the function to any other mobile device 10 capable of controlling the wearable module 30 by merely performing the locking or the unlocking for the wearable module 30 once.

Also, the special input section 32 inputs biometric information and controls the function to be locked/unlocked on the basis of the input biometric information. In this case, because the wearable module 30 locks/unlocks the function on the basis of the biometric information, the wearable module 30 can independently lock/unlock the function without the lock/unlock request from the mobile device 10.

Also, the function control system 1 includes the wearable module 30 capable of performing short-range communication with the mobile device 10 and the mobile device 10. In the wearable module 30, the functional section 33 executes a function which can be locked and unlocked, the list retaining section 35 retains a password which is information for permitting the locking/unlocking of the function for each mobile device 10, the short-range wireless communication section 31 receives a request for locking/unlocking the function including the password from the mobile device 10, and the lock control section 36 locks/unlocks the function on the basis of the password included in the request received by the short-range wireless communication section 31 and a password retained in association with the mobile device 10 of a request source of the request. In the mobile device 10, the functional section 13 executes a function, wherein stop and stop release of the function is possible, the list retaining section 15 retains a password which is information for permitting the locking/unlocking of the function, the input section 12 receives the permission information, and the lock control section 16 controls the locking or unlocking of the function by the functional section 13 on the basis of the password and the password retained by the list retaining section 15 and transmits a request for locking or unlocking the function including the password to the wearable module 30.

In this case, because the wearable module 30 retains the password which is the information for permitting the locking/unlocking of the function for each mobile device 10, it is possible to lock or unlock the function for the wearable module 30 from a plurality of mobile devices 10 capable of transmitting the password. Also, the mobile device 10 can lock or unlock the function retained by the mobile device 10 using the same password.

REFERENCE SIGNS LIST

1 Function control system
10 Mobile device
11 Short-range wireless communication section
12 Input section
13 Functional section
14 Chip section
15 List retaining section
16 Lock control section
30 Wearable module
31 Short-range wireless communication section
32 Special input section
33 Functional section
34 Chip section
35 List retaining section
36 Lock control section
37 Connection state detection section

The invention claimed is:

1. A short-range communication device capable of performing short-range communication with a terminal apparatus, the short-range communication device comprising circuitry configured to:
   execute a predetermined function, wherein stop and stop release of the predetermined function are possible;
   retain permission information which is information for permitting the stop or the stop release of the predetermined function for each terminal apparatus;
   receive a request for the stop or the stop release of the predetermined function including permission information from the terminal apparatus; and
   control the stop or the stop release of the predetermined function on the basis of the permission information included in the request received and permission information retained in association with the terminal apparatus of a request source of the request,
   wherein the short-range communication device executes a plurality of mutually different functions,
   wherein the short-range communication device retains the permission information in units of functions, and
   wherein the predetermined function is from a group of functions including at least utilization of a contactless communication function on the short-range communication device and access to data stored on a secure element of the short-range communication device.

2. The short-range communication device according to claim 1, wherein, for a terminal apparatus other than the terminal apparatus related to the request received together with control of the stop or the stop release of the predetermined function, the short-range communication device transmits permission information retained in association with the terminal apparatus.

3. The short-range communication device according to claim 1,
   wherein the short-range communication device inputs biometric information and control the stop or the stop release of the predetermined function on the basis of the input biometric information.

4. A function control system including a short-range communication device capable of performing short-range communication with a terminal apparatus and the terminal apparatus,
   wherein the short-range communication device includes circuitry configured to:
      execute a predetermined function, wherein stop and stop release of the predetermined function are possible;
      retain permission information which is information for permitting the stop or the stop release of the predetermined function for each terminal apparatus;
      receive a request for the stop or the stop release of the predetermined function including permission information from the terminal apparatus; and
      control the stop or the stop release of the predetermined function on the basis of the permission information included in the request received and permission information retained in association with the terminal apparatus of a request source of the request,
   wherein the short-range communication device executes a plurality of mutually different functions,
   wherein the short-range communication device retains the permission information in units of functions,
   wherein the terminal apparatus includes circuitry configured to:
      execute a predetermined function, wherein stop and stop release of the predetermined function are possible;
      retain permission information which is information for permitting the stop or the stop release of the predetermined function;
      receive permission information; and
      control the stop or the stop release of the predetermined function on the basis of the permission information received and the permission information retained and transmit a request for the stop or the stop release of the function including permission information to the short-range communication device, and
   wherein the predetermined function is from a group of functions including at least utilization of a contactless communication function on the short-range communication device and access to data stored on a secure element of the short-range communication device.

5. A function control method by a short-range communication device capable of performing short-range communication with a terminal apparatus and including circuitry configured to execute a predetermined function, wherein stop and stop release of the predetermined function are possible and retain permission information which is information for permitting the stop or the stop release of the predetermined function for each terminal apparatus, wherein the short-range communication device executes a plurality of mutually different functions, and wherein the short-range communication device retains the permission information in units of functions, the function control method comprising:

a reception step of receiving a request for the stop or the stop release of the predetermined function including permission information from the terminal apparatus; and a control step of controlling the stop or the stop release of the predetermined function on the basis of the permission information included in the request received in the reception step and permission information retained in association with the terminal apparatus of a request source of the request, wherein the predetermined function is from a group of functions including at least utilization of a contactless communication function on the short-range communication device and access to data stored on a secure element of the short-range communication device.

6. A function control method to be executed by a function control system including a short-range communication device capable of performing short-range communication with a terminal apparatus and the terminal apparatus, wherein the short-range communication device includes circuitry configured to:

execute a predetermined function, wherein stop and stop release of the predetermined function are possible; and retain permission information which is information for permitting the stop or the stop release of the predetermined function for each terminal apparatus, wherein the short-range communication device executes a plurality of mutually different functions, wherein the short-range communication device retains the permission information in units of functions, wherein the terminal apparatus includes circuitry configured to:

execute a predetermined function, wherein stop and stop release of the function are possible; and retain permission information which is information for permitting the stop or the stop release of the predetermined function, and wherein the function control method includes:

a reception step of receiving, by the short-range communication device, a request for the stop or the stop release of the predetermined function including permission information from the terminal apparatus;

a control step of controlling, by the short-range communication device, the stop or the stop release of the predetermined function on the basis of the permission information included in the request received in the reception step and permission information retained in association with the terminal apparatus of a request source of the request;

a terminal-side reception step of receiving, by the terminal apparatus, permission information in the terminal apparatus; and a terminal-side control step of controlling, by the terminal apparatus, the stop or the stop release of the predetermined function on the basis of the permission information received in the terminal-side reception step and the permission information retained and transmitting a request for the stop or the stop release of the predetermined function including permission information to the short-range communication device, wherein the function is from a group of functions including at least utilization of a contactless communication function on the short-range communication device and access to data stored on a secure element of the short-range communication device.

\* \* \* \* \*